(12) United States Patent
Park (10) Patent No.: US 12,529,933 B2
(45) Date of Patent: Jan. 20, 2026

(54) LIGHT CONTROL PANEL AND DISPLAY DEVICE INCLUDING THE SAME

(71) Applicant: LG Display Co., Ltd., Seoul (KR)

(72) Inventor: Jaehyun Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 682 days.

(21) Appl. No.: 17/955,474

(22) Filed: Sep. 28, 2022

(65) Prior Publication Data

US 2023/0185150 A1  Jun. 15, 2023

(30) Foreign Application Priority Data

Dec. 14, 2021 (KR) .................. 10-2021-0178890

(51) Int. Cl.
*G02F 1/166* (2019.01)
*G02F 1/1676* (2019.01)

(52) U.S. Cl.
CPC ............ *G02F 1/166* (2019.01); *G02F 1/1676* (2019.01)

(58) Field of Classification Search
CPC ........ G02F 1/166; G02F 1/1676; G02F 1/169; G02F 2201/44; G02F 2203/01; G02F 1/172; G02F 1/1677; G02F 1/167; H10K 59/121; H10K 59/50
See application file for complete search history.

(56) References Cited

U.S. PATENT DOCUMENTS

| | | | |
|---|---|---|---|
| 8,610,661 B2 | 12/2013 | Verschueren et al. | |
| 9,128,288 B2 | 9/2015 | Lee et al. | |
| 2009/0015545 A1 | 1/2009 | Kato et al. | |
| 2009/0295765 A1 | 12/2009 | Verschueren et al. | |
| 2014/0177025 A1* | 6/2014 | Lee ..................... | G02B 26/026 |
| | | | 359/245 |

FOREIGN PATENT DOCUMENTS

| | | |
|---|---|---|
| JP | 2009-020279 A | 1/2009 |
| JP | 2009-543154 A | 12/2009 |
| KR | 10-2014-0076438 A | 6/2014 |
| KR | 10-2226426 B1 | 3/2021 |

OTHER PUBLICATIONS

Korean Intellectual Property Office, Office Action, Korean Patent Application No. 10-2021-0178890, Dec. 17, 2024, 16 pages.

\* cited by examiner

*Primary Examiner* — James C. Jones
(74) *Attorney, Agent, or Firm* — Fenwick & West LLP (57) ABSTRACT

The present disclosure relates to a display device including a pixel portion in which sub-pixels are disposed and at least one transparent portion which is disposed around the pixel portion and transmits external light therethrough, wherein the pixel portion may include first to fourth extension parts which extend in different directions and include wirings, and may include first to fourth circuit parts which are disposed between the adjacent extension parts and include circuit elements of each of the sub-pixels.

26 Claims, 10 Drawing Sheets

LIGHT CONTROL PANEL AND DISPLAY DEVICE INCLUDING THE SAME

CROSS-REFERENCE TO RELATED APPLICATIONS

The present application claims priority to Korea Patent Application No. 10-2021-0178890, filed on Dec. 14, 2021, the entire contents of which is incorporated herein for all purposes by this reference.

BACKGROUND

Field

The present disclosure relates to a light control panel and a display device including the same.

Description of the Related Art

An organic light-emitting display device displays an image by using an organic light-emitting diode that generates light by recombination of electrons and holes. The organic light-emitting display device is a self-light emitting display device. Since the organic light-emitting display device has a rapid response speed and is driven by low power consumption, it is in the spotlight as a next-generation display.

The organic light-emitting display device may be formed as a transparent display device by making a transistor or a light-emitting element within the device transparent or by separating a circuit part and a transparent part. A typical transparent display device has a rectangular transparent part and a transparency of about 40%. In such a transparent display device, since the fixed transparent part allows a user to visually recognize the background of the transparent display device, the readability of an image is reduced and it is difficult to implement a completely black color.

SUMMARY

Technical Problem

The purpose of the present disclosure is to provide a display device which is provided with a suspended particle display (SPD), and thus, has an improved transmittance and is able to implement a completely black color.

Technical Solution

One embodiment is a display device including: a display panel comprising a pixel area in which pixels are disposed and a transmissive area disposed adjacent to the pixel area; and a light control panel configured to be disposed on a rear surface of the display panel and to control light transmittance according to an externally applied data voltage. The light control panel includes: a first electrode and a second electrode which are formed of a transparent conductive material and are supplied with a voltage; a suspended particle layer interposed between the first electrode and the second electrode; and an insulating polymer layer that is interposed between the suspended particle layer and the first electrode and comprises conductive metal electrodes patterned in the form of island.

The suspended particle layer may include colored suspended particles which are dispersed in a transparent solvent and are electrically charged.

At least a portion of the metal electrode may be disposed to overlap the pixel area, and a remaining portion of the metal electrode may be disposed to overlap the transmissive area.

The insulating polymer layer may include a transparent polymer insulating material in which a plurality of holes are formed. The metal electrodes may be formed to fill an entire or a portion of each of the holes.

The hole and the metal electrode may be formed such that a width at a top surface thereof that is in contact with the suspended particle layer is greater than or equal to a width at a bottom surface thereof that is in contact with the first electrode.

When the voltage is applied to the first electrode, the voltage may be transmitted to the metal electrodes in contact with the first electrode. The suspended particles may be aggregated around the metal electrode by an electric field formed between the first electrode and the second electrode.

When the suspended particles are aggregated around the metal electrode, a part of light incident from the outside of the light control panel may pass through the transmissive area of the display panel and the light control panel and may be emitted to a top surface of the display panel.

When the voltage is not applied to the first electrode, light incident from the outside of the light control panel may be blocked from being emitted to a top surface of the display panel by the dispersed suspended particles.

The first electrode may be patterned into a plurality of areas which are divided from each other and receive the voltage independently.

Sizes and shapes of the plurality of areas may be determined in response to a split screen mode provided through the display panel.

When the voltage is applied to a first area among the plurality of areas, the voltage may be transmitted to first metal electrodes disposed on the first area, and the suspended particles may be aggregated only around the first metal electrodes.

When the suspended particles are aggregated only around the first metal electrodes, external light incident on the first area may pass through the transmissive area of the display panel and the light control panel and may be emitted to a top surface of the display panel, and external light incident on the remaining areas may be blocked from being emitted to the top surface of the display panel by the dispersed suspended particles.

Another embodiment is a light control panel including: a first electrode which is formed of a transparent conductive material and receives a first voltage; a second electrode which is formed of the transparent conductive material and receives a second voltage; a suspended particle layer interposed between the first electrode and the second electrode; and an insulating polymer layer that is interposed between the suspended particle layer and the first electrode and comprises conductive metal electrodes patterned in the form of island.

The suspended particle layer may include colored suspended particles which are dispersed in a transparent solvent and are electrically charged.

The insulating polymer layer may include a transparent polymer insulating material in which a plurality of holes are formed. The metal electrodes may be formed to fill an entire or a portion of each of the holes.

The hole and the metal electrode may be formed such that a width at a top surface thereof that is in contact with the suspended particle layer is greater than or equal to a width at a bottom surface thereof that is in contact with the first electrode.

A ratio of a pitch between the metal electrodes to a width between the metal electrodes may be about 89%.

The suspended particle layer may be composed of electronic ink in which carbon black is dispersed in a fluid or in oil solvent.

The suspended particle layer may be formed by dropping or applying the electronic ink between adjacent dams.

The polymer insulating material may be an adhesive film or UV resin.

Advantageous Effects

The light control panel and the display device including the same according to the embodiments can have an improved transmittance and simultaneously can improve the readability of an image by implementing a completely black color.

In addition, the light control panel and the display device including the same according to the embodiments have a reduced manufacturing cost and have improved reliability and an improved driving speed by being driven at a low voltage.

DETAILED DESCRIPTION

Hereinafter, embodiments of the present disclosure will be described with reference to the accompanying drawings. In this specification, when it is mentioned that a component (or region, layer, portion) "is on", "is connected to", or "is combined with" another component, terms "is on", "connected to", or "combined with" mean that a component may be directly connected to/combined with another component or mean that a third component may be disposed between them.

The same reference numerals correspond to the same components. Also, in the drawings, the thicknesses, ratios, and dimensions of the components are exaggerated for effective description of the technical details. A term "and/or" includes all of one or more combinations that related configurations can define.

While terms such as the first and the second, etc., can be used to describe various components, the components are not limited by the terms mentioned above. The terms are used only for distinguishing between one component and other components. For example, the first component may be designated as the second component without departing from the scope of rights of various embodiments. Similarly, the second component may be designated as the first component. An expression of a singular form includes the expression of plural form thereof unless otherwise explicitly mentioned in the context.

Terms such as "below", "lower", "above", "upper" and the like are used to describe the relationships between the components shown in the drawings. These terms have relative concepts and are described based on directions indicated in the drawings.

In the present specification, it should be understood that the term "include" or "comprise" and the like is intended to specify characteristics, numbers, steps, operations, components, parts or any combination thereof described in the specification, and intended not to previously exclude the possibility of existence or addition of at least one other characteristics, numbers, steps, operations, components, parts or any combination thereof.

Figure 1:
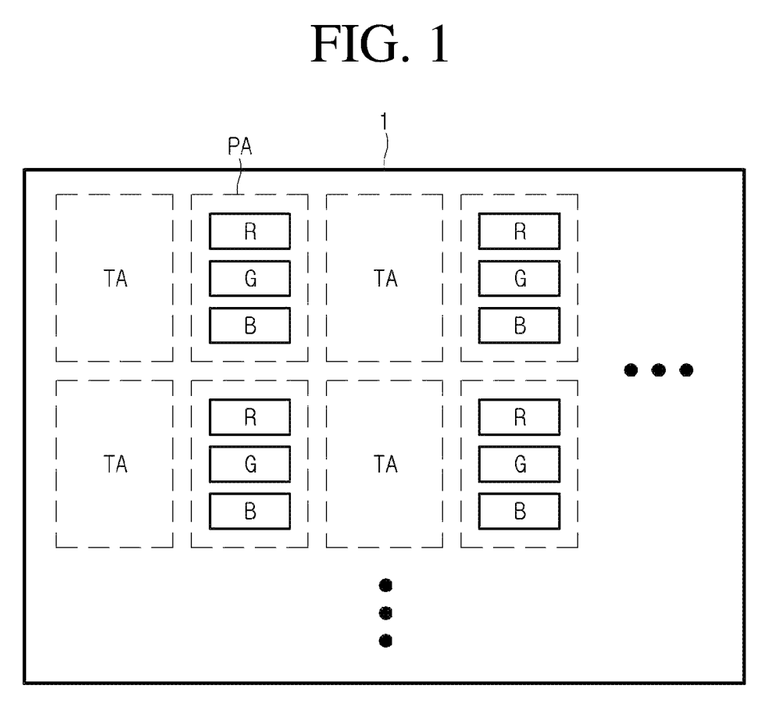
FIG. 1 is a plan view showing schematically a display device according to an embodiment of the present disclosure.

FIG. 1 is a plan view showing schematically a display device according to an embodiment of the present disclosure.

Referring to FIG. 1, the display device 1 includes a pixel area PA in which pixels R, G, and B are disposed and a transmissive area TA disposed adjacent to the pixel area PA.

Light emitting devices of the pixels R, G, and B may be disposed in the pixel area PA respectively and may emit light according to a current amount controlled by a driving transistor. Three or four pixels R, G, and B that emit light in different colors may be disposed in one pixel area PA, and the embodiment is not limited thereto. For example, each of the pixels R, G, and B may emit light in any one of red, green, and blue colors. In the embodiment, the sizes of the pixels R, G, and B may be the same as or different from each other. For example, the green pixel G may have a larger area than those of the red pixel R and the blue pixel B. However, the embodiment is not limited thereto. In one pixel area PA, the pixels R, G, and B may be arranged in a row direction or in a column direction, or may be arranged in the form of a matrix. Embodiments of the present disclosure is not limited thereto. For example, a white pixel could be further included. And combinations of other colors such as magenta, yellow and cyan are also possible.

The transmissive area TA is a remaining area other than the pixel area PA, and the pixels R, G, and B are not disposed in the transmissive area TA. The pixel area PA and the transmissive area TA may be continuously disposed without physical separation.

The transmissive area TA has light-transmitting properties and may be transparent or translucent in order to transmit incident light. For this, layers stacked on the transmissive area TA may be made of transparent or translucent materials. Through the structure including the transmissive area TA, the display device 1 may function as a transparent display device.

Figure 2:
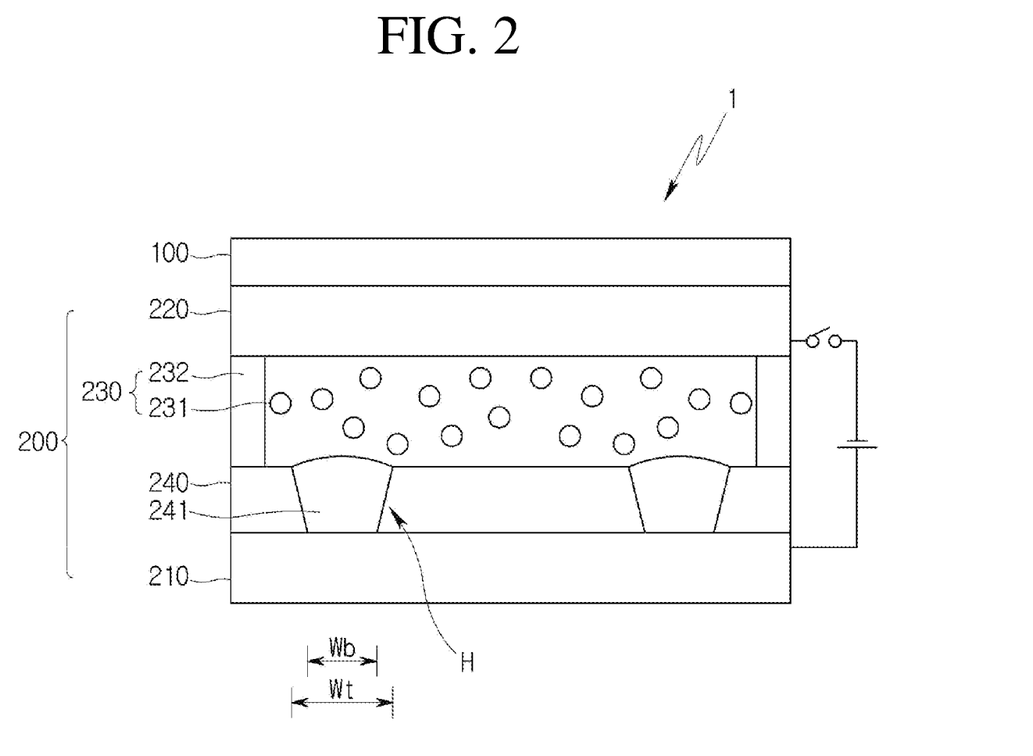
FIG. 2 is a cross sectional side view of the display device according to the embodiment of the present disclosure.
Figure 3:
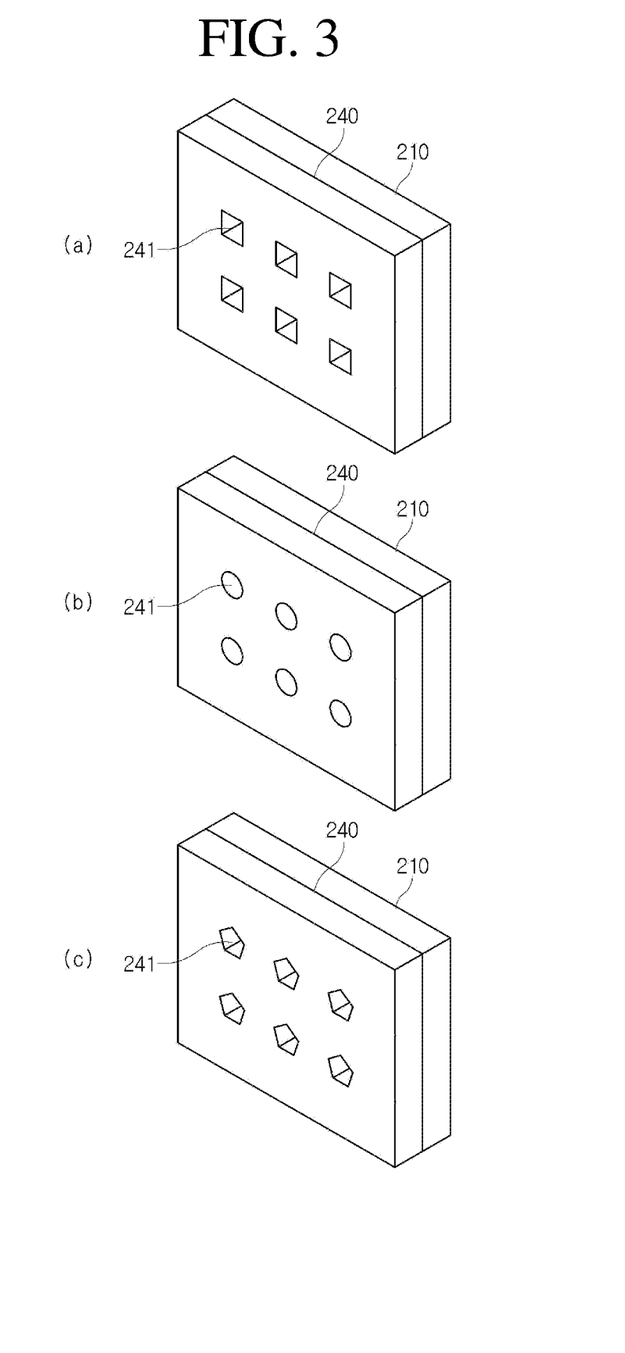
FIG. 3 is a perspective view according to various embodiments of a suspended particle device shown in FIG. 2.

FIG. 2 is a cross sectional side view of the display device according to the embodiment of the present disclosure. FIG. 3 is a perspective view according to various embodiments of a suspended particle device shown in FIG. 2.

Referring to FIGS. 2 and 3, the display device 1 according to the embodiment has a structure in which a display panel 100 and a light control panel 200 are stacked.

The display panel 100 displays an image in response to a data signal and a scan signal supplied through driving parts. As described with reference to FIG. 1, the display panel 100 includes the pixel area PA and the transmissive area TA. A plurality of data lines and a plurality of gate lines are disposed in the pixel area PA, and the pixels R, G, and B are disposed at intersections of the data line and the gate line. The transmissive area TA is disposed adjacent to the pixel areas PA and is transparent or translucent in order to transmit incident light.

The light control panel 200 may be disposed on one surface, for example, a rear surface of the display panel 100. The light control panel 200 may be driven according to an externally applied data voltage, and light transmittance may be controlled. When the light control panel 200 is controlled in a light transmission mode, the background of the display device 1 may be visually recognized by viewers through the transmissive area TA of the display panel 100 and the light control panel 200. Conversely, when the light control panel 200 is controlled in a light blocking mode, the background of the display device 1 is blocked by the light control panel 200 and thus is not visually recognized by viewers. Accordingly, the quality of the image displayed on the display panel 100 can be improved.

To this end, the light control panel 200 may include a first electrode 210 connected to a first voltage (e.g., a high potential voltage (+)), a second electrode 220 connected to a second voltage (e.g., a low potential voltage (−)), and a suspended particle layer 230 interposed between the first electrode 210 and the second electrode 220. In addition, an insulating polymer layer 240 is further interposed between the first electrode 210 and the suspended particle layer 230. But embodiments of the present disclosure are not limited thereto. For example, the first electrode 210 may be connected to a second voltage (e.g., a low potential voltage (−)), and the second electrode 220 may be connected to a first voltage (e.g., a high potential voltage (+)).

In the embodiment, the light control panel 200 may be disposed on a unshown substrate. The substrate may be a light-transmitting substrate as a base substrate of the display device 1. The substrate may be a rigid substrate including glass or tempered glass or a flexible substrate made of a plastic material. For example, the substrate may be made of a plastic material such as polyimide, polyethylene terephthalate (PET), polyethylene naphthalate (PEN), polycarbonate (PC), or the like. However, the material of the substrate is not limited thereto.

The first electrode 210 and the second electrode 220 may be formed of a transparent conductive material. For example, the first electrode 210 and the second electrode 220 may be formed of indium tin oxide (ITO), indium zinc oxide (IZO), zinc oxide (ZnO), or the like. Accordingly, even when the first electrode 210 and the second electrode 220 are disposed to overlap each other in the transmissive area TA of the display panel 100, the transmittance of the display panel 100 is not reduced.

The suspended particle layer 230 includes an electrical behavior material, and may be composed of, for example, a suspended particle device. The suspended particle layer 230 may implement the light transmission mode and the light blocking mode by adjusting the arrangement or direction of suspended particles 231 in accordance with a voltage difference between the first electrode 210 and the second electrode 220.

The suspended particle layer 230 may include charged suspended particles 231 dispersed in a solvent, and may be composed of, for example, electronic ink. The solvent is a transparent, low-viscosity insulating solvent, which may be composed of, for example, a fluid or oil (silicone oil).

The suspended particles 231 are charged colored particles, and their arrangement may be adjusted according to a voltage difference between the first electrode 210 and the second electrode 220. These suspended particles 231 may be, for example, black particles. For example, the suspended particles 231 may be formed of carbon black or Cl pigment black 26 or 28 (e.g., manganese ferrite black spinel or copper chromite black spinel), etc. However, this embodiment is not limited thereto.

The suspended particle layer 230 may be formed by dropping or applying electronic ink between adjacent dams 232 (or sealants).

The insulating polymer layer 240 may be made of a transparent polymer insulating material, for example, an adhesive film, UV resin, etc. The insulating polymer layer 240 may include a metal electrode 241 that is patterned in the form of an island within a transparent polymer insulating material. The metal electrode 241 may be formed of a conductive material, for example, silver (Ag), copper (Cu), aluminum (Al), nickel (Ni), or an alloy thereof. But embodiments of the present disclosure are not limited thereto. For example, the insulating polymer layer 240 may also include an electrode that is patterned in the form of an island within a transparent polymer insulating material and is formed of a conductive material other than metal.

The metal electrode 241 may be patterned regularly or irregularly within the polymer insulating material. The metal electrode 241 may be generally disposed to overlap the pixel area PA. In the embodiment, at least a portion of the metal electrode 241 may be disposed to overlap the transmissive area TA. One or more metal electrodes 241 overlap one pixel area PA and one transmissive area TA adjacent to the pixel area, and the number of metal electrodes is not particularly limited.

The metal electrode 241 may have, as shown in FIG. 3, various planar shapes, such as a quadrangle, a circle, a pentagon, etc. It is enough that the planar shape of the metal electrode 241 is a closed island shape. The shape of the metal electrode is not particularly limited.

The metal electrode 241 may be disposed within the holes H formed in the insulating polymer layer 240 as shown in FIG. 2. The hole H may be formed to pass through the polymer insulating material in the up and down direction as shown. However, the embodiment is not limited thereto. The metal electrode 241 may be, as shown in FIG. 2, formed to fill the entire hole H. In another embodiment, the metal electrode 241 is formed to fill only a portion of the hole H. This embodiment will be described in more detail below with reference to FIG. 7.

In the embodiment, the hole H may be formed such that a width Wt at the top surface thereof that is in contact with the suspended particle layer 230 is greater than or equal to a width Wb at the bottom surface thereof that is in contact with the first electrode 210 (i.e., Wt≥Wb). Accordingly, the hole H may obtain a shape corresponding to the metal electrode 241 formed therewithin.

Here, the top surface of the metal electrode 241 may be convex or concave as shown, depending on the constituent material thereof.

Figure 4:
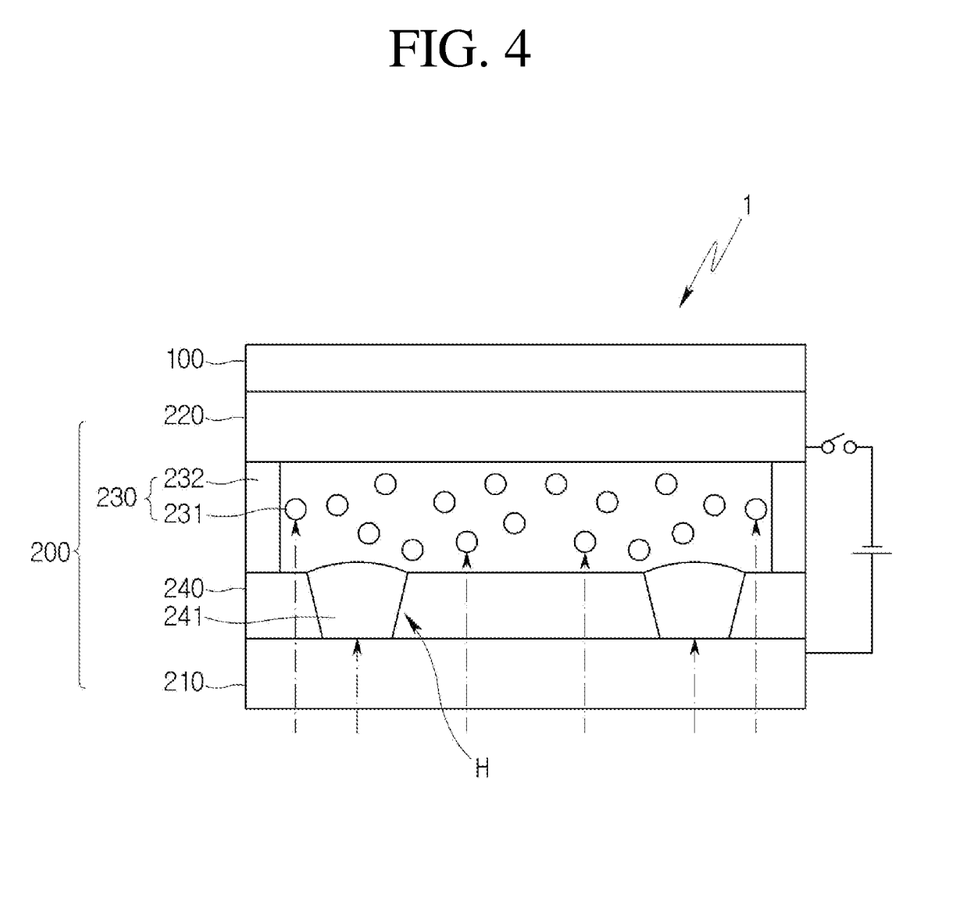
FIG. 4 shows an operation state of the display device according to a light blocking mode of a light control panel.
Figure 5:
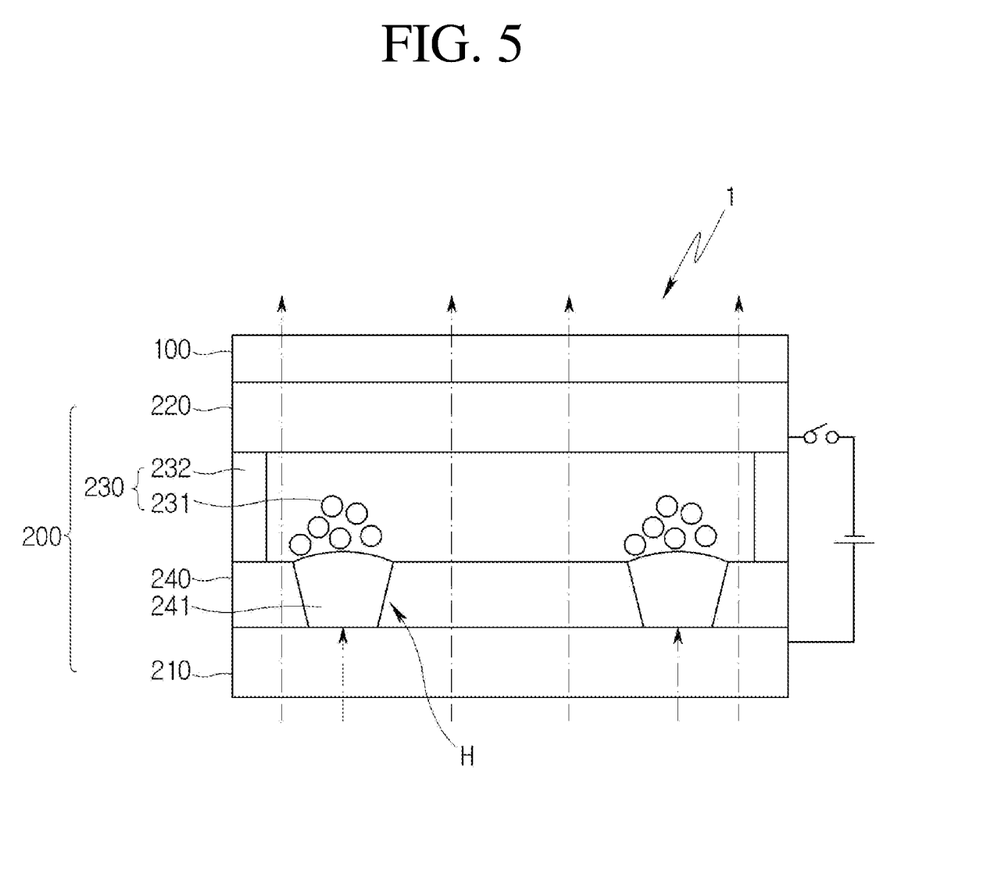
FIG. 5 shows an operation state of the display device according to a light transmission mode of the light control panel.

FIG. 4 shows an operation state of the display device according to the light blocking mode of the light control panel. FIG. 5 shows an operation state of the display device according to the light transmission mode of the light control panel.

As described with reference to FIGS. 2 and 3, the display device 1 according to the embodiment has the suspended particle layer 230. The metal electrode 241 patterned in the form of island is formed on the insulating polymer layer 240 within the suspended particle layer 230.

As shown in FIG. 4, the metal electrode 241 is electrically connected to a first power source through the first electrode 210. When no voltage is applied to the first electrode 210 and the second electrode 220, the suspended particles 231 are dispersed within the suspended particle layer 230 and block external light applied to the back surface of the display device 1, etc. Accordingly, the light blocking mode in which the backlight of the display device 1 cannot pass through the display device 1 is implemented. As shown in FIG. 4, when the light control panel 200 is driven in the light blocking mode, a contrast ratio of the image displayed on the display panel 100 can increase and the readability can be improved.

When a voltage is applied to the first electrode 210, the voltage is transmitted to the metal electrode 241 connected to the first electrode 210. Then, the suspended particles 231 dispersed in the suspended particle layer 230 may be aggregated around the metal electrode 241 by an electric field formed between the metal electrode 241 and the second electrode 220.

Since the suspended particles 231 are collected around the metal electrode 241, only the first electrode 210, the transparent polymer insulating material, the fluid of the suspended particle layer 230, and the second electrode 220 are stacked in the area where the metal electrode 241 is not formed. Accordingly, external light may be transmitted through the front surface of the light control panel 200, and the light transmission mode of the light control panel 200 is implemented. As shown in FIG. 5, when the light control panel 200 is implemented in the light transmission mode, the background of the display panel 100 may be visually recognized by a user through the transmissive area TA, and the display device 1 may be implemented as a transparent display device.

When at least a portion of the metal electrode 241 is disposed to overlap the transmissive area TA of the display panel 100, the metal electrode 241 may reduce the transmittance of the display device 1. In particular, when the size of the metal electrode 241 increases, the metal electrode 241 and the suspended particles 231 aggregated around the metal electrode 241 may reduce the transmittance of the display device 1 and may obstruct the user's view in the light transmission mode. Accordingly, the size of the metal electrode 241 may be appropriately selected such that the transmittance of the display device 1 is not reduced and the quality of the image is not deteriorated.

Figure 6:
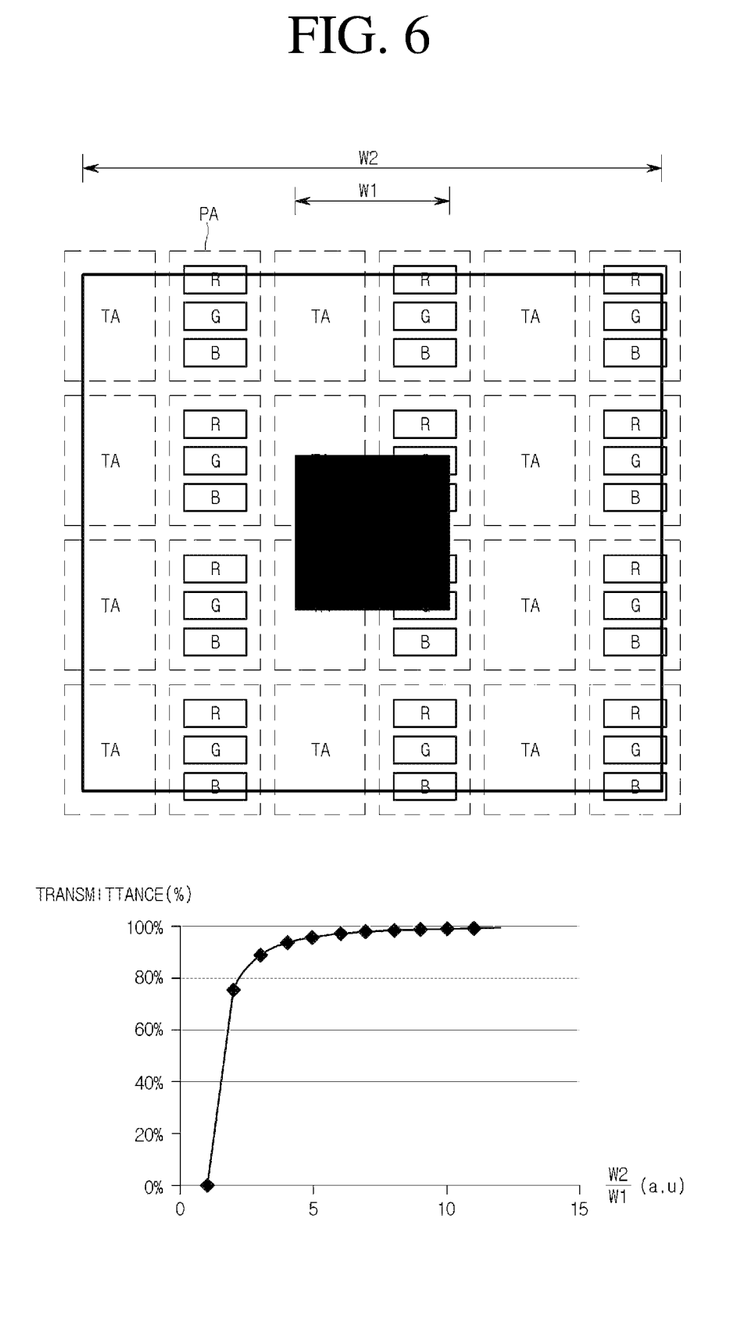
FIG. 6 shows a transmittance of the display device according to a ratio of a pitch to a width of a metal electrode.

FIG. 6 shows the transmittance of the display device according to a ratio of a pitch to a width of the metal electrode.

In the display device 1 described with reference to FIGS. 2 and 3, when the metal electrode 241 occupies a large proportion, the metal electrode 241 is visually recognized by the user, thereby reducing the transmittance of the display device 1. Conversely, when the metal electrode 241 occupies a small proportion, the suspended particles 231 are not sufficiently collected, thereby deteriorating the quality of the image. Therefore, a proportion that the metal electrode 241 occupies within the insulating polymer layer 240 should be appropriately selected such that the transmittance of the display device 1 is not reduced and the quality of the image is not deteriorated.

Referring to FIG. 6, when a width W1 of the metal electrode 241 decreases or a pitch W2 between the metal electrodes 241 increases, and thus, a ratio of the pitch W2 to the width W1 (W2/W1) increases, the visibility of the metal electrode 241 with respect to the transmissive area TA may decrease and the transmittance of the display device 1 may be improved. Conversely, when the width W1 of the metal electrode 241 increases or the pitch W2 between the metal electrodes 241 decreases, and thus, the ratio of the pitch W2 to the width W1 (W2/W1) decreases, the visibility of the metal electrode 241 with respect to the transmissive area TA may increase and the transmittance of the display device 1 may be reduced.

In the shown example, the metal electrode 241 may be formed to have the ratio of the pitch W2 to the width W1 (W2/W1) of about 89% in order to obtain a collecting force of the suspended particles 231 without reducing the transmittance of the display device 1. However, the embodiment is not limited thereto. But the embodiments of the present disclosure are not limited thereto. For example, the ratio of the pitch W2 to the width W1 (W2/W1) may be about 85% to 95%, about 80% to 98%, etc.

Figure 7:
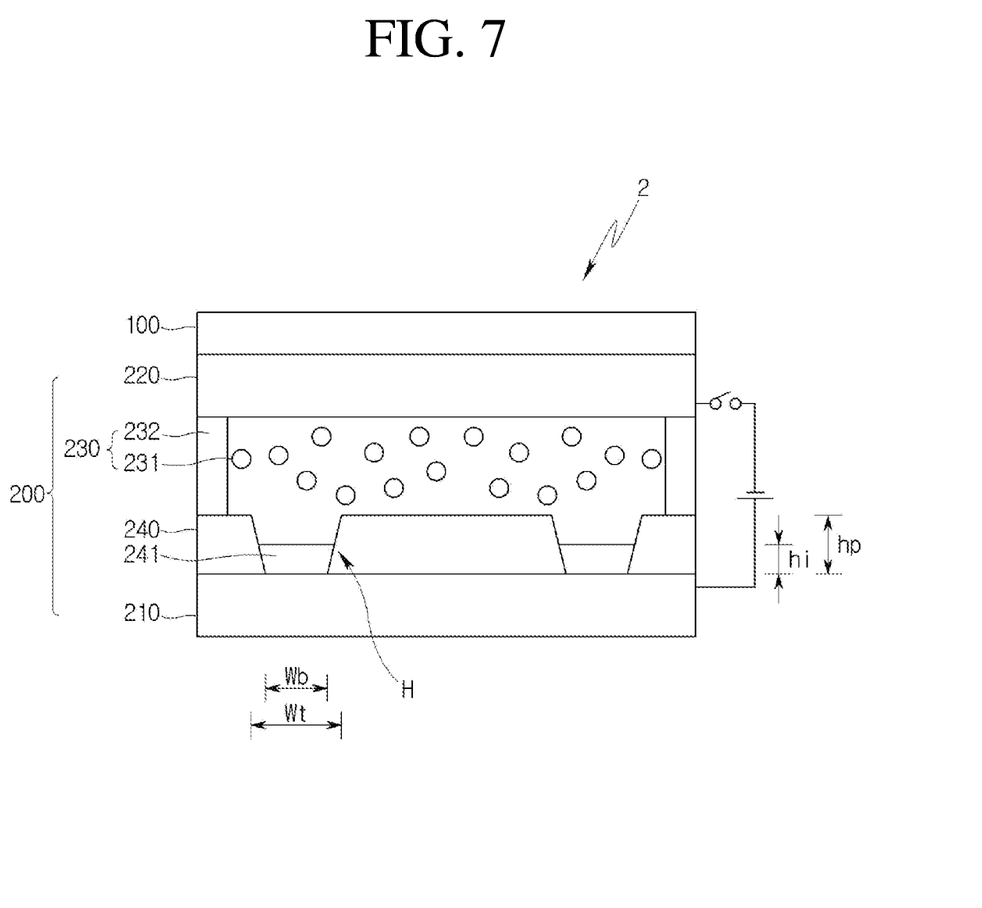
FIG. 7 is a cross sectional side view of the display device according to another embodiment of the present disclosure.

FIG. 7 is a cross sectional side view of the display device according to another embodiment of the present disclosure.

Referring to FIG. 7, in a display device 2 according to another embodiment, the metal electrode 241 is formed to fill only a portion of the hole H formed in the insulating polymer layer 240. In such an embodiment, the overall height "hp" of the hole is greater than the height "hi" of the metal electrode 241 (hp>hi).

In this embodiment, when a voltage is applied to the first electrode 210, the voltage is transmitted to the metal electrode 241 connected to the first electrode 210. Then, the suspended particles 231 dispersed in the suspended particle layer 230 may be aggregated around the metal electrode 241 by an electric field formed between the metal electrode 241 and the second electrode 220.

Here, the suspended particles 231 may be introduced into the hole H that is not filled with the metal electrode 241. In this embodiment, the collecting force of the metal electrode 241 with respect to the suspended particles 231 may be improved and the operation efficiency and reliability of the transmission mode may be improved.

Figure 8:
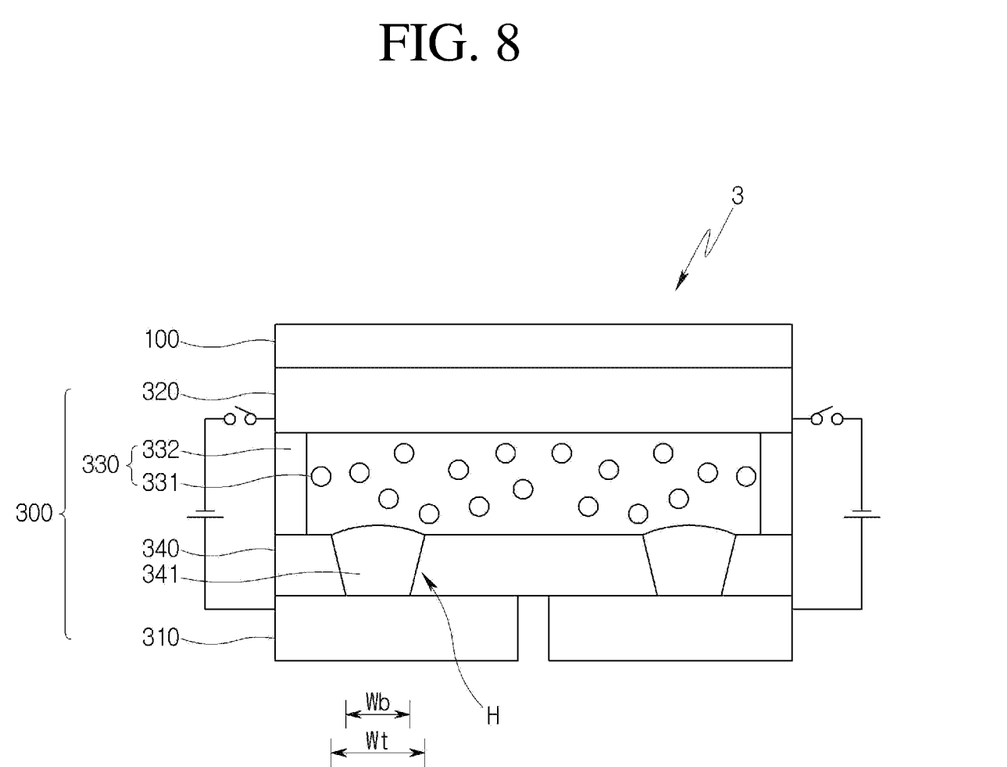
FIG. 8 is a cross sectional side view of the display device according to further another embodiment of the present disclosure.
Figure 9:
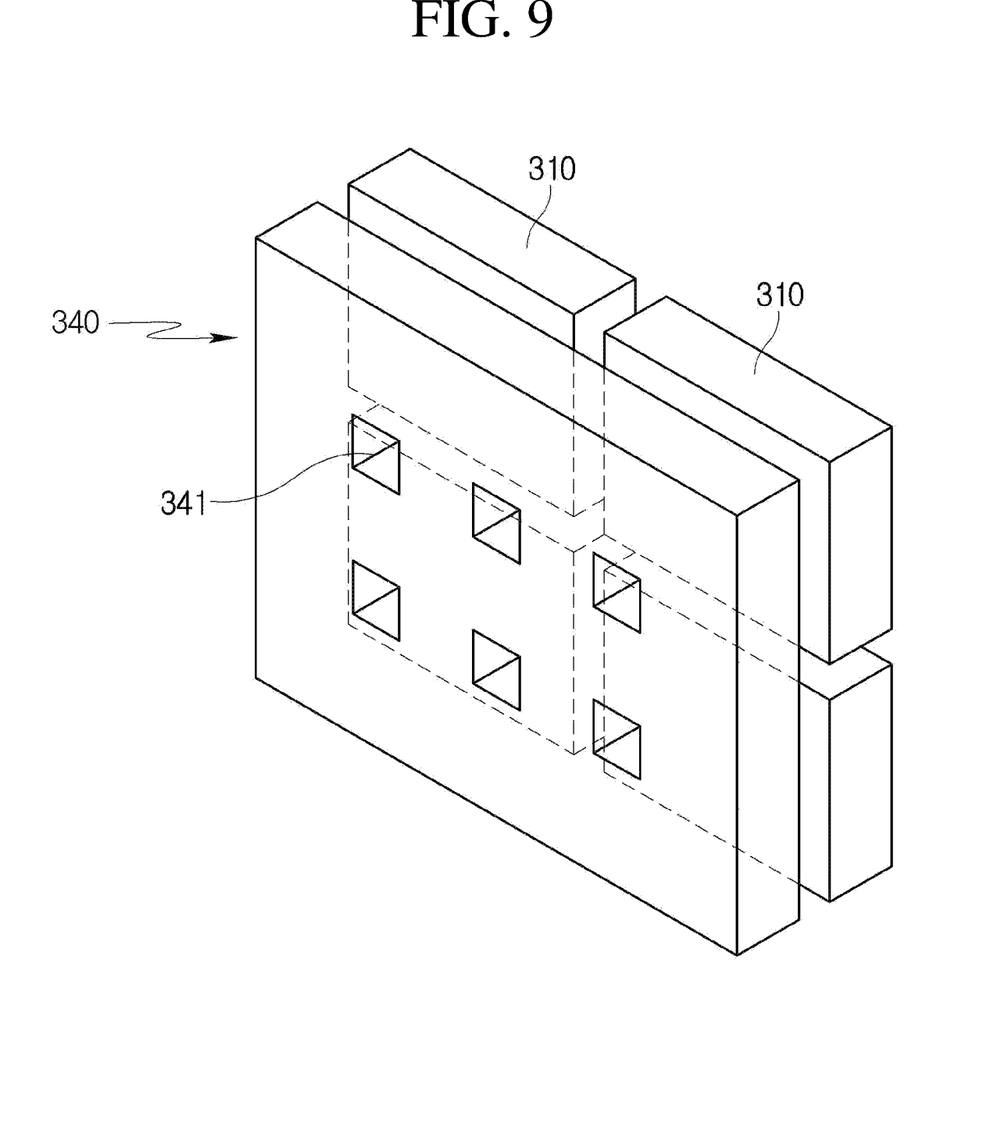
FIG. 9 is a perspective view of the suspended particle device shown in FIG. 8.

FIG. 8 is a cross sectional side view of the display device according to further another embodiment of the present disclosure. FIG. 9 is a perspective view of the suspended particle device shown in FIG. 8.

Referring to FIG. 8, a display device 3 according to further another embodiment has a structure in which the display panel 100 and a light control panel 300 are stacked.

The display panel 100 displays an image in response to a data signal and a scan signal supplied through driving parts. As described with reference to FIG. 1, the display panel 100 includes the pixel area PA and the transmissive area TA. A plurality of data lines and a plurality of gate lines are disposed in the pixel area PA, and the pixels R, G, and B are disposed at intersections of the data line and the gate line. The transmissive area TA is disposed adjacent to the pixel areas PA and is transparent or translucent in order to transmit incident light.

The light control panel 300 may be disposed on one surface, for example, a rear surface of the display panel 100. The light control panel 300 may be driven according to an externally applied data voltage, and light transmittance may be controlled. When the light control panel 300 is controlled in a light transmission mode, the background of the display device 3 may be visually recognized by viewers through the transmissive area TA of the display panel 100 and the light control panel 300. Conversely, when the light control panel 300 is controlled in a light blocking mode, the background of the display device 3 is blocked by the light control panel 300 and thus is not visually recognized by viewers. Accordingly, the quality of the image displayed on the display panel 100 can be improved.

The light control panel 300 may include a first electrode 310 connected to a first voltage (e.g., a high potential voltage (+)), a second electrode 320 connected to a second voltage (e.g., a low potential voltage (−)), and a suspended particle layer 330 interposed between the first electrode 310 and the second electrode 320. In addition, an insulating polymer layer 340 is further interposed between the first electrode 310 and the suspended particle layer 330.

In the embodiment, the light control panel 300 may be disposed on a unshown substrate. The substrate may be a light-transmitting substrate as a base substrate of the display device 3. The substrate may be a rigid substrate including glass or tempered glass or a flexible substrate made of a plastic material. For example, the substrate may be made of a plastic material such as polyimide, polyethylene terephthalate (PET), polyethylene naphthalate (PEN), polycarbonate (PC), or the like. However, the material of the substrate is not limited thereto.

The first electrode 310 and the second electrode 320 may be formed of a transparent conductive material. For example, the first electrode 310 and the second electrode 320 may be formed of indium tin oxide (ITO), indium zinc oxide (IZO), zinc oxide (ZnO), or the like. Accordingly, even when the first electrode 310 and the second electrode 320 are disposed to overlap each other in the transmissive area TA of the display panel 100, the transmittance of the display panel 100 is not reduced.

Compared to the embodiments shown in FIGS. 2 and 3, in this embodiment, the first electrode 310 may be patterned into a plurality of divided areas as shown in FIG. 9. The patterned first electrode 310 may have a matrix shape as shown. However, the embodiment is not limited thereto, and the first electrode 310 may have a stripe shape or the like in other various embodiments. Here, the patterned areas may be independently connected to the first power source respectively.

Here, the patterned size and shape of the first electrode 310 may be determined variously in response to screen areas set in order to provide a split screen mode such as picture in picture (PIP), picture by picture (PBP), etc., described later. That is, each pattern of the first electrode 310 may be set in response to at least one pixel area PA and/or at least one transmissive area TA, and the patterned size and shape of the first electrode 310 is not particularly limited.

The suspended particle layer 330 includes an electrical behavior material, and may be composed of, for example, a suspended particle device. The suspended particle layer 330 may implement the light transmission mode and the light blocking mode by adjusting the arrangement or direction of suspended particles 331 in accordance with a voltage difference between the first electrode 310 and the second electrode 320.

The suspended particle layer 330 may include charged suspended particles 331 dispersed in a solvent, and may be composed of, for example, electronic ink. The solvent is a transparent, low-viscosity insulating solvent, which may be composed of, for example, a fluid or oil (silicone oil).

The suspended particles 331 are charged colored particles, and may be, for example, black particles. For example, the suspended particles 331 may be formed of carbon black or Cl pigment black 26 or 28 (e.g., manganese ferrite black spinel or copper chromite black spinel), etc. However, this embodiment is not limited thereto.

The suspended particle layer 330 may be formed by dropping or applying electronic ink between adjacent dams 332 (or sealants).

The insulating polymer layer 340 may be made of a transparent polymer insulating material, for example, an adhesive film, UV resin, etc. The insulating polymer layer 340 may include a metal electrode 341 that is patterned in the form of island within a transparent polymer insulating material. The metal electrode 341 may be formed of a conductive material, for example, silver (Ag), copper (Cu), aluminum (Al), nickel (Ni), or an alloy thereof.

The metal electrode 341 may be patterned regularly or irregularly within the polymer insulating material. The metal electrode 341 may be generally disposed to overlap the pixel area PA. In the embodiment, at least a portion of the metal electrode 341 may be disposed to overlap the transmissive area TA. In addition, one or more metal electrodes 341 may be disposed in response to one pattern of the first electrode 310, and the number of the metal electrodes 341 is not particularly limited.

The metal electrode 341 may have, as shown in FIG. 9, various planar shapes, such as a quadrangle, a circle, a pentagon, etc. It is enough that the planar shape of the metal electrode 341 is a closed island shape. The shape of the metal electrode is not particularly limited.

The metal electrode 341 may be disposed within holes H formed in the insulating polymer layer 340 as shown in FIG. 8. The hole H may be formed to pass through the insulating polymer layer 340 in the up and down direction as shown. However, the embodiment is not limited thereto. The metal electrode 341 may be, as shown in FIG. 8, formed to fill the entire hole H. In another embodiment, the metal electrode 341 is formed to fill only a portion of the hole H.

In the embodiment, the hole H may be formed such that a width Wt at the top surface thereof that is in contact with the suspended particle layer 330 is greater than or equal to a width Wb at the bottom surface thereof that is in contact with the first electrode 310 (i.e., Wt>Wb). Accordingly, the hole H may obtain a shape corresponding to the metal electrode 341 formed therewithin.

Figure 10:
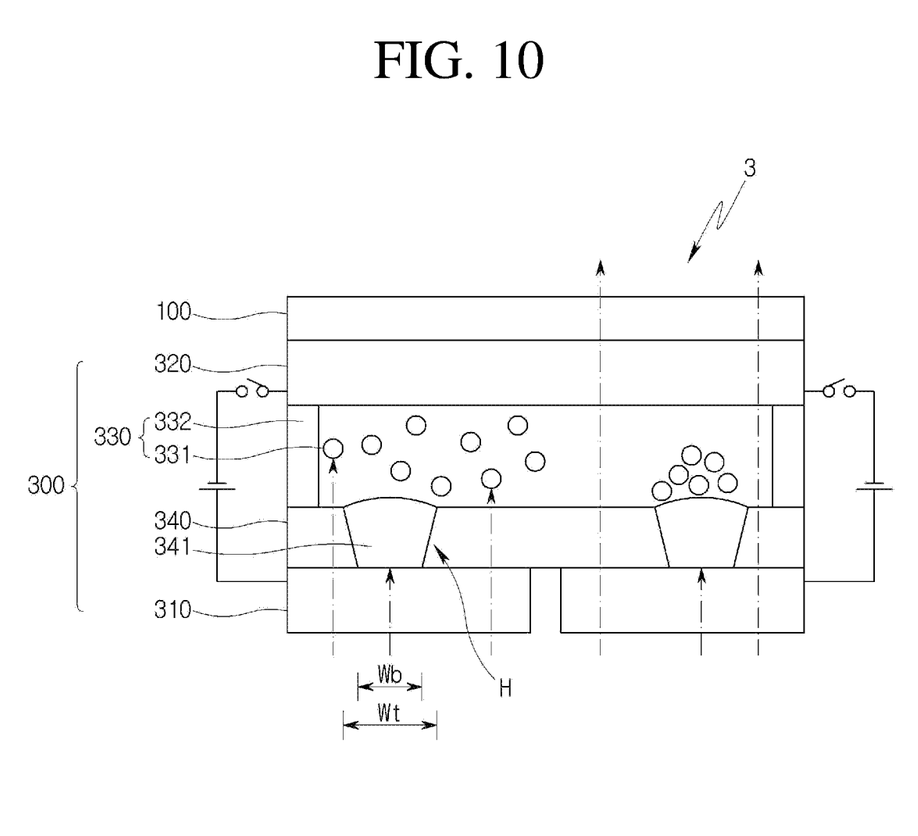
FIG. 10 shows an operation state of the display device according to the light blocking mode of the light control panel.

FIG. 10 shows an operation state of the display device according to the light blocking mode of the light control panel.

As described with reference to FIGS. 8 and 9, in the display device 3 according to the embodiment, the first electrode 310 is patterned into the plurality of areas.

As shown in FIG. 8, the metal electrode 341 is electrically connected to a first power source through the first electrode 310. When no voltage is applied to the first electrode 310 and the second electrode 320, the suspended particles 331 are dispersed within the suspended particle layer 330 and block external light applied to the back surface of the display device 3, etc. Accordingly, the light blocking mode in which the backlight of the display device 3 cannot pass through the display device 3 is implemented.

When a voltage is applied to the first electrode 310, the voltage is transmitted to the metal electrode 341 connected to the first electrode 310. In particular, in this embodiment, a voltage may be applied to only a first area among the areas of the patterned first electrode 310. Then, an electric field is formed only between the first area of the first electrode 310 to which the voltage has been applied and the second electrode 320. Then, the suspended particles 331 are aggregated around the metal electrode 341, and the suspended particles 331 remain dispersed in the remaining area.

External light applied to the back surface of the display device 3 is transmitted through the front surface of the light control panel 200 in the first area where the suspended particles 331 are aggregated, and the transmission of the light is blocked in the remaining area. That is, the display device 3 may be partially driven in the light transmitting mode and in the light blocking mode.

In the embodiment, when the image is displayed on only a partial area of the display panel 100 and no image is displayed on the remaining area, a voltage may be applied to the pattern of the first electrode 310 with respect to the partial area where the image is not displayed. Then, in the area where the image is displayed, the light control panel 300 operates in the light blocking mode and improves the readability of the image, and the light control panel 300 operates in the light transmission mode in the remaining area and enables the display device 3 to function as a transparent display device.

In another embodiment, when a first image that requires high readability is displayed on some areas of the display panel 100 (e.g., text, basic UI, etc.) and a second image that does not require readability is displayed on the remaining areas of the display panel 100, a voltage may be controlled to be applied to the pattern of the first electrode 310 with respect to the partial area where the second image is displayed. Then, the light control panel 300 operates in the light blocking mode in the area where the first image is displayed, thereby improving the readability of the first image.

While the embodiment of the present invention has been described with reference to the accompanying drawings, it can be understood by those skilled in the art that the present invention can be embodied in other specific forms without departing from its spirit or essential characteristics. Therefore, the foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A display device comprising:
    a display panel comprising a pixel area in which pixels are disposed and a transmissive area disposed adjacent to the pixel area; and
    a light control panel disposed on a surface of the display panel and configured to control light transmittance according to an externally applied data voltage,
    wherein the light control panel comprises:
        a first electrode and a second electrode which are formed of a transparent conductive material and are supplied with a voltage;
        a suspended particle layer interposed between the first electrode and the second electrode; and
        an insulating polymer layer that is interposed between the suspended particle layer and the first electrode and comprises conductive metal electrodes patterned in the form of an island,
        wherein the insulating polymer layer comprises a transparent polymer insulating material in which a plurality of holes are included, and
        wherein the metal electrodes are disposed in each of the holes.

2. The display device of claim 1, wherein the light control panel is disposed on a bottom surface of the display panel opposite to a top surface of the display panel for displaying an image.

3. The display device of claim 2, wherein the suspended particle layer comprises colored suspended particles which are dispersed in a transparent solvent and are electrically charged.

4. The display device of claim 3, wherein at least a portion of the metal electrode is disposed to overlap the pixel area.

5. The display device of claim 4, wherein at least a portion of the metal electrode is disposed to overlap the transmissive area.

6. The display device of claim 3, wherein the suspended particles are black particles.

7. The display device of claim 3,
    wherein the metal electrodes are disposed to fill an entire or a portion of each of the holes.

8. The display device of claim 7, wherein the hole and the metal electrode are formed such that a width at a top surface thereof that is in contact with the suspended particle layer is greater than or equal to a width at a bottom surface thereof that is in contact with the first electrode.

9. The display device of claim 7, wherein, when the voltage is applied to the first electrode, the voltage is transmitted to the metal electrodes in contact with the first electrode, and wherein the suspended particles are aggregated around the metal electrode by an electric field formed between the first electrode and the second electrode.

10. The display device of claim 9, wherein, when the suspended particles are aggregated around the metal electrode, a part of light incident from the outside of the light control panel passes through the transmissive area of the display panel and the light control panel and is emitted to the top surface of the display panel.

11. The display device of claim 7, wherein, when the voltage is not applied to the first electrode, light incident from the outside of the light control panel is blocked from being emitted to the top surface of the display panel by the dispersed suspended particles.

12. The display device of claim 7, wherein the first electrode is patterned into a plurality of areas which are divided from each other and receive the voltage independently.

13. The display device of claim 12, wherein sizes and shapes of the plurality of areas are determined in response to a split screen mode provided through the display panel.

14. The display device of claim 13, wherein, when the voltage is applied to a first area among the plurality of areas, the voltage is transmitted to first metal electrodes disposed on the first area, and the suspended particles are aggregated only around the first metal electrodes in the first area.

15. The display device of claim 14, wherein, when the suspended particles are aggregated only around the first metal electrodes in the first area, external light incident on the first area passes through the transmissive area of the display panel and the light control panel and is emitted to the top surface of the display panel, and external light incident on the remaining areas among the plurality of areas is blocked from being emitted to the top surface of the display panel by the dispersed suspended particles.

16. The display device of claim 12, wherein, when an image is displayed on only a portion of the display panel and no image is displayed on the remaining portion of the display panel, the voltage is applied to areas among the plurality of areas of the first electrode overlapping the portion of the display panel, and is not applied to remaining areas among the plurality of areas.

17. The display device of claim 2, wherein the first electrode is disposed above or under the second electrode.

18. The display device of claim 2, wherein the first electrode is configured to receive one of a high potential voltage and a low potential voltage, and the second electrode is configured to receive the other of the high potential voltage and the low potential voltage.

19. A light control panel comprising:
a first electrode comprising a transparent conductive material and receiving a first voltage;
a second electrode of comprising the transparent conductive material and receiving a second voltage;
a suspended particle layer interposed between the first electrode and the second electrode; and
an insulating polymer layer that is interposed between the suspended particle layer and the first electrode and comprises conductive metal electrodes patterned in the form of an island,
wherein the insulating polymer layer comprises a transparent polymer insulating material in which a plurality of holes are included, and
wherein the metal electrodes are disposed in each of the holes.

20. The light control panel of claim 19, wherein the suspended particle layer comprises colored suspended particles which are dispersed in a transparent solvent and are electrically charged.

21. The light control panel of claim 20, wherein the metal electrodes are disposed to fill an entire or a portion of each of the holes.

22. The light control panel of claim 21, wherein the hole and the metal electrode are formed such that a width at a top surface thereof that is in contact with the suspended particle layer is greater than or equal to a width at a bottom surface thereof that is in contact with the first electrode.

23. The light control panel of claim 21, wherein a ratio of a pitch between the metal electrodes to a width of the metal electrodes is 89%.

24. The light control panel of claim 21, wherein the suspended particle layer is comprised of electronic ink in which carbon black is dispersed in a fluid or in oil solvent.

25. The light control panel of claim 24, wherein the suspended particle layer is formed by dropping or applying the electronic ink between adjacent dams.

26. The light control panel of claim 21, wherein the polymer insulating material is an adhesive film or UV resin.

* * * * *